United States Patent [19]
Bachofer et al.

[11] 3,735,224
[45] May 22, 1973

[54] RELAY CIRCUIT FOR MOTOR CONTROL

[75] Inventors: Henry L. Bachofer, Newtown Square; Robert C. C. Chang, Wayne, both of Pa.

[73] Assignee: Sun Oil Company of Pennsylvania, Philadelphia, Pa.

[22] Filed: Apr. 12, 1972

[21] Appl. No.: 243,260

[52] U.S. Cl. .................................318/284, 318/374
[51] Int. Cl. ...................................................Ho2p 3/20
[58] Field of Search..............318/252, 256, 264–267, 318/282–286, 288, 290, 297, 364, 369, 374, 462, 484–487

[56] References Cited
UNITED STATES PATENTS

| | | | |
|---|---|---|---|
| 2,449,223 | 9/1948 | Hayman | 318/374 X |
| 3,147,420 | 9/1964 | Mros | 318/374 X |
| 3,223,910 | 12/1965 | Greenwald | 318/285 X |

Primary Examiner—Bernard A. Gilheany
Assistant Examiner—W. E. Duncanson, Jr.
Attorney—George L. Church, Donald R. Johnson, Wilmer E. McCorquodale, Jr. et al.

[57] ABSTRACT

In order to precisely position a machine driven by a rotating prime mover, the prime mover (electric motor) is electrically reversed to bring it to a stop. A zero speed switch, mounted on the motor shaft, senses when the shaft comes to a stop and at that time deenergizes a relay to open a pair of contacts in series with the motor contactor to stop the motor. The switch also opens the circuit to the winding of a slow-acting relay which, after a time delay, closes a pair of contacts connected in parallel with the previously-mentioned contacts, to prepare the motor for the next operation.

6 Claims, 1 Drawing Figure

COUPLED TO
RAM DRIVEN
BY MOTOR-1

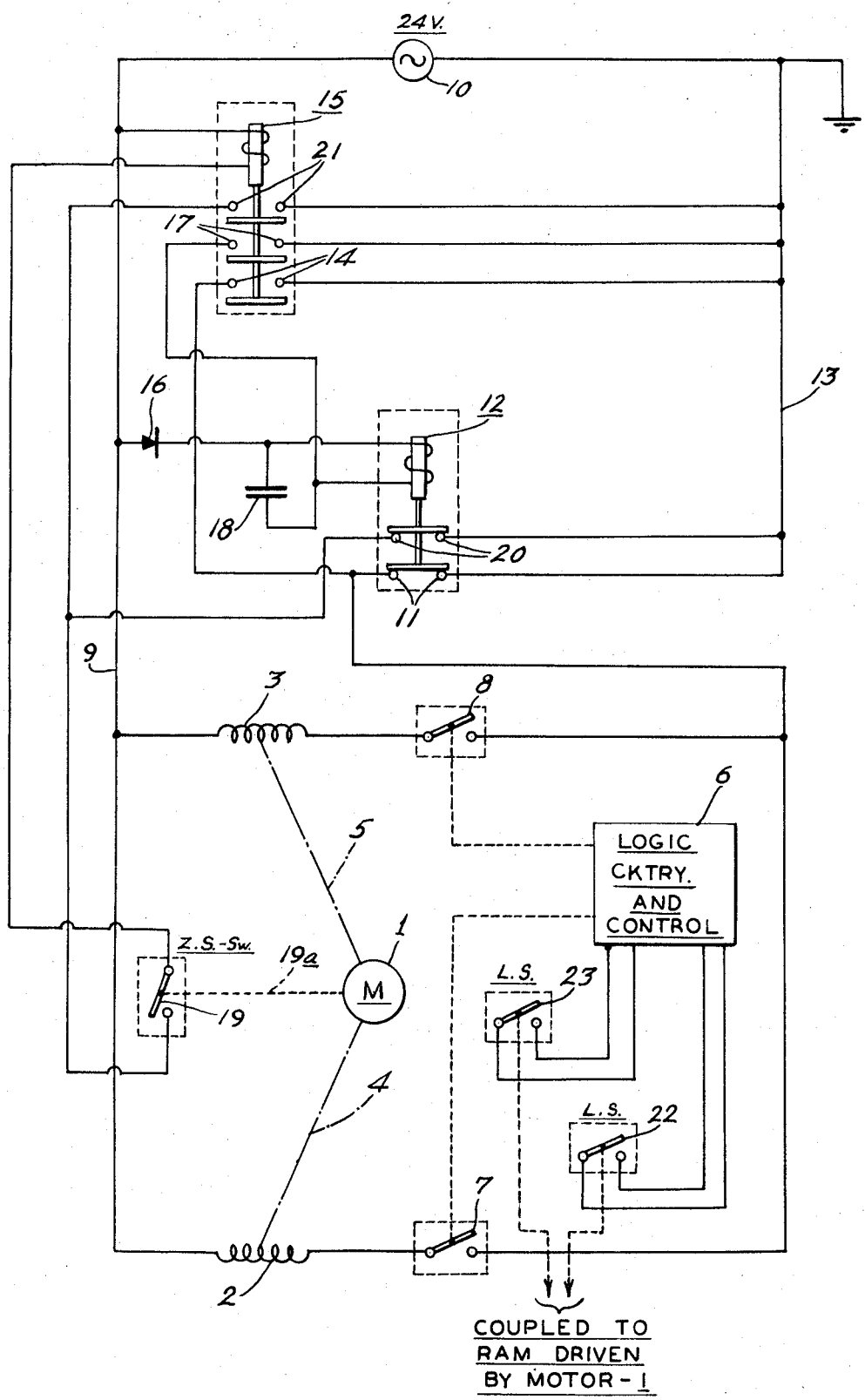

RELAY CIRCUIT FOR MOTOR CONTROL

This invention relates to a relay circuit useful for the control of an electric motor.

In many machine operations, exact positioning is important. In a typical example, using a three-phase reversible electric motor as a prime mover, a ram must be moved from a home position, extended a certain distance, then immediately reversed and returned to the home position in preparation for the next operation. A switch or other sensing device is used to locate the desired position (the "home position"); at this point, the motor is reversed to brake it to a stop. In this connection, it is pointed out that reversing the motor electrically brings it to zero rotation much sooner than would be the case when using a friction device; furthermore, since the braking action is of a magnetic nature, there is no wear on costly friction areas, as in the case of mechanical brakes.

Desirably, when the motor shaft comes to a stop, all energization circuits for the motor must be broken, and the brakes (if any) applied, as positioning is now complete. Unfortunately, however, in some cases a slow-acting position sensing circuit must be used for various reasons; such a circuit, although capable of locating the desired stopping point, does not have the required speed of operation necessary to deenergize the prime mover before it actually reverses and rotates in the opposite direction; this rotation in the opposite direction would require re-positioning.

To state the foregoing in another way, when a zero speed switch (which senses when the motor shaft comes to a stop) is used for positioning, the switch contacts are usually connected in series with the motor contactor winding and bypassed with the starting contact (controller contact). Proper operation of such a circuit (i.e., in order to avoid the necessity for re-positioning) would require a total time delay of less than 50 milliseconds; on the other hand, a primary controller employing fluidics, for example, is very slow acting as compared to the aforementioned time delay (required for proper operation), having, for example, a delay of about 300 milliseconds for both forward and reverse controller contacts.

An object of this invention is to provide a novel relay circuit for controlling an electric motor.

Another object is to provide a circuit which will operate to effect exact positioning of an electric motor which is under the control of a relatively slow-acting primary controller.

A further object is to provide a novel motor positioning circuit utilizing a zero speed switch.

The objects of this invention are accomplished, briefly, in the following manner: A zero speed switch is connected in series with the winding of a relay which has one pair of contacts connected in series with the motor contactor winding and another pair of contacts connected in series with the winding of a time delay dropout relay. The latter relay has one pair of normally closed contacts connected in series with the motor contactor windings and another pair of normally closed contacts connected in series with the switch and the winding of the first relay, so that upon release of the time delay relay the motor and the first relay are prepared for the next operation. The zero speed switch is closed during movement of the device (ram) by the motor toward a home position, and opens when the motor shaft comes to a stop, thus opening the motor energization circuits.

A detailed description of the invention follows, taken in conjunction with the accompanying drawing, wherein the single FIGURE is a schematic diagram of a circuit according to this invention.

Referring now to the drawing, a three-phase electric motor 1, which is the motor to be controlled by the circuit of this invention, has associated therewith a "forward" motor contactor winding 2 and a "reverse" motor contactor winding 3. Although not illustrated in the drawing, the windings 2 and 3 actually comprise the principal operating parts of respective three-phase contactors which energize the motor 1; energization of winding 2 causes the motor 1 to rotate in the forward direction, and energization of winding 3 causes the motor to rotate in the reverse direction. The coupling between contactor 2 and motor 1 is indicated schematically by the dot-dash line 4, while the coupling between contactor 3 and the motor is indicated schematically by the dot-dash line 5.

A logic circuitry and control unit 6 (employing fluidics, for example) comprises a primary controller for operating the (fluidic-type) forward controller contacts 7 (illustrated as a switch) in series with contactor 2, and also the (fluidic-type) reverse controller contacts 8 (also illustrated as a switch) in series with contactor 3. The primary controller (unit 6) is slow acting, having a delay of about 300 milliseconds for both the forward controller contact 7 and the reverse controller contact 8.

One end of each of the contactors 2 and 3 is connected directly to one terminal bus 9 of an alternating current source 10 (24 volts, 60 Hz) used for energization of the motor contactors. The other end of contactor 2 is connected through the controller contacts 7 and the normally closed contacts 11 of a relay 12 to the other (grounded) terminal bus 13 of source 10. The other end of contactor 3 is connected through the controller contacts 8 and the same relay contacts 11 to the bus 13. The normally open contacts 14 of an alternating current relay 15 are connected in parallel with the relay contacts 11.

The relay 12 is a direct current relay, one end of its winding being connected through a diode rectifier 16 to the a.c. bus 9. The other end of the winding of this relay is connected through the normally open contacts 17 of relay 15 to bus 13. The relay 12 is a time delay dropout (TDDO) or time delay releasing relay, made so by means of a large capacitor 18 connected across the relay winding. It may thus be stated that there is a time delay of about 500 milliseconds between the time when the circuit to the winding of this relay is opened (by contacts 17, as will be described) and the time when its normally closed contacts such as 11 move to the closed position illustrated in the drawing.

A zero speed switch 19 of conventional type is coupled to the shaft of motor 1, as schematically indicated at 19a. The single-pole, single-throw contacts of this switch close when the motor shaft rotates in the reverse direction, and open when the motor speed goes to zero (that is to say, when the motor shaft stops rotating in the reverse direction). The contacts of switch 19 are connected in series in a circuit as follows: bus 9, winding of relay 15, switch 19 contacts, the normally closed contacts 20 of relay 12, grounded bus 13. A holding circuit for relay 15 includes the normally open contacts 21 of relay 15, which are connected in parallel with relay contacts 20.

To begin a cycle of operation, logic information developed in unit (primary controller) 6 causes controller contacts 7 to close, energizing the forward motor contactor 2 from source 10 through these contacts and the normally closed contacts 11 of relay 12. The motor 1 then rotates in the forward direction, driving the ram from the home position toward the fully extended position.

When the ram reaches a fully extended position, a pneumatic limit switch 22 (which is mechanically coupled to the ram driven by the motor, and whose fluid couplings are connected into the circuit of unit 6) causes the logic control unit 6 to open controller contacts 7 and close controller contacts 8, deenergizing the forward motor contactor 2 and energizing the reverse motor contactor 3 from source 10 through contacts 8 and the normally closed relay contacts 11. The motor 1 then reverses and returns the ram toward the home position. When the motor begins its reverse rotation, the zero speed switch 19 closes, energizing the winding of relay 15 from source 10 through switch 19 and the normally closed relay contacts 20. Relay 15 then closes its contacts 14, 17, and 21.

Contacts 14 seal in around contacts 11 so that when relay 12 is energized, contactor 3 will remain energized. Contacts 21 complete a holding circuit for relay 15, paralleling contacts 20 of relay 12. Contacts 17 complete the energization circuit for relay 12, which then opens its contacts 20 and 11. Contacts 11 being open, the zero speed switch 19 can now open the circuit to the motor (by deenergizing relay 15, which then would open its contacts 14, in series with reverse contactor 3), should the motor stop for any reason.

When the ram reaches a home position, a pneumatic limit switch 23 (which is also mechanically coupled to the ram, and whose fluid couplings are connected into the circuit of unit 6) causes the controller 6 to open the controller contacts 8 and close the controller contacts 7. The closure of contacts 7 energizes the contactor 2, through the (now closed) relay contacts 14. This electrically reverses the motor 1 (actually, of course, by energization of the forward contactor 2) to being it to a stop.

When the motor speed goes to zero (which is to say, when the motor shaft actually stops rotating in the reverse direction), the contacts of the zero speed switch 19 open, deenergizing relay 15 (since switch 19 is in series with the winding of this relay). Relay contacts 14, 17, and 21 then open. The opening of contacts 14 deenergizes contactor 2 (the paralleled contacts 11 being open because relay 12 is now energized), even though the controller contacts 7 may still be closed due to a control system lag of 300 milliseconds. Thus, all motor circuits are now deenergized (including, of course, the contactor 3, which is also connected in series with contacts 14), and positioning in a home position is now complete.

The opening of contacts 17 breaks the circuit to the winding of relay 12, but the shunt capacitor 18 delays the relay dropout for 500 milliseconds.

The opening of contacts 21 opens the circuit to the winding of relay 15, preventing reenergization thereof (which would otherwise result if the switch contacts 19 bounce).

All circuits are now inoperative for 500 milliseconds (the dropout or delay time of relay 12), which gives time for the controller contacts 7 or 8 to open (under the control of unit 6) in preparation for the next cycle of operation. When relay 12 releases or drops out, its contacts 11 and 20 reclose, which returns the circuit to its original condition, ready for the next cycle of operation.

The invention claimed is:

1. A circuit for accurate positioning of a device driven by a motor, comprising a reversible driving motor, a first contactor winding which when energized causes rotation of said motor in one direction, a second contactor winding which when energized causes rotation of said motor in the opposite direction, a primary controller for causing energization of said two windings in an essentially alternate manner, a position sensor coupled to said motor-driven device for sensing a desired position thereof, said sensor operating upon said controller to cause it to deenergize said first winding and to energize said second winding in response to the reaching of said desired position by said device; a zero speed switch coupled to said motor, said switch being operated to closed position in response to rotation of said motor in said one direction and being operated to open position under the condition of a zero motor speed; and means acting in response to the opening of said switch for breaking the energization circuits for both of said windings.

2. Circuit of claim 1, including also means acting in response to the opening of said switch for reestablishing, upon the lapse of a predetermined time interval measured from the opening of said switch, the energization circuits for both of said windings.

3. Circuit in accordance with claim 2, wherein said reestablishing means includes a relay having an operating winding connected to be energized upon the closing of said switch, and having a pair of normally closed contacts connected in series in the energization circuits for both of said contactor windings.

4. Circuit set forth in claim 3, wherein said relay is of the time delay dropout type.

5. Circuit according to claim 1, wherein said means acts in response to the closing of said switch for establishing energization circuits for both of said windings.

6. Circuit in accordance with claim 1, wherein said means includes a relay having an operating winding connected in series with said switch in an energization circuit, and having a pair of contacts connected in series in the energization circuits for both of said contactor windings.

* * * * *